US011920912B2

(12) United States Patent
Hsu

(10) Patent No.: US 11,920,912 B2
(45) Date of Patent: Mar. 5, 2024

(54) AUTOMATIC BERTHING IMAGE RANGING SYSTEM FOR VESSELS AND OPERATION METHOD THEREOF

(71) Applicant: SHIP AND OCEAN INDUSTRIES R&D CENTER, New Taipei (TW)

(72) Inventor: Ming-Hsiang Hsu, New Taipei (TW)

(73) Assignee: SHIP AND OCEAN INDUSTRIES R&DCENTER, New Taipei (TW)

( * ) Notice: Subject to any disclaimer, the term of this patent is extended or adjusted under 35 U.S.C. 154(b) by 258 days.

(21) Appl. No.: 17/551,167

(22) Filed: Dec. 14, 2021

(65) Prior Publication Data
US 2023/0175832 A1 Jun. 8, 2023

(30) Foreign Application Priority Data
Dec. 8, 2021 (TW) ................................. 110145904

(51) Int. Cl.
*G01B 11/00* (2006.01)
*G06T 7/11* (2017.01)
*G06V 20/00* (2022.01)
*G06V 20/05* (2022.01)

(52) U.S. Cl.
CPC .............. *G01B 11/002* (2013.01); *G06T 7/11* (2017.01); *G06V 20/05* (2022.01); *G06V 20/95* (2022.01)

(58) Field of Classification Search
CPC ......... G01B 11/002; G01B 11/26; G06T 7/11; G06V 20/05; G06V 20/95
See application file for complete search history.

(56) References Cited

FOREIGN PATENT DOCUMENTS

| CN | 103901806 A | 7/2014 | |
|---|---|---|---|
| CN | 105204411 A | 12/2015 | |
| JP | 2005-28891 A | 2/2005 | |
| TW | 201207781 A1 | 2/2012 | |
| TW | 202131278 A | 8/2021 | |
| WO | WO-2016112708 A1 * | 7/2016 | ............... G06T 7/50 |
| WO | WO-2021141338 A1 * | 7/2021 | ............... G06T 7/11 |

* cited by examiner

*Primary Examiner* — Peter B Kim
(74) *Attorney, Agent, or Firm* — Cheng-Ju Chiang

(57) ABSTRACT

The present disclosure provides an automatic berthing image ranging system for vessels and operation method thereof, the method comprising: obtaining a reference image around a position in which a vessel is located, the reference image comprises a first pattern and at least two second patterns; the reference image is projected to a reference plane to generate projection coordinates corresponding to the first pattern and the at least two patterns; determining a positional relationship between the vessel and a port by a predetermined distance, and the positional relationship is represented by an angle value.

9 Claims, 8 Drawing Sheets

AUTOMATIC BERTHING IMAGE RANGING SYSTEM FOR VESSELS AND OPERATION METHOD THEREOF

FIELD OF THE INVENTION

The present invention relates to automatic berthing image ranging system and operation method thereof, and more particularly to automatic berthing image ranging system for vessels oscillating freely with small amplitude and operation method thereof.

BACKGROUND

The traditional berthing operations of vessels are primarily realized by manual operations (e.g., realizing the berthing operations after comprehensively considering a variety of factors such as the speed and the angle of the berthing vessel, the size of vessel, and the size of port). That is, the traditional berthing operations rely heavily on the skills and judgment of operators.

Nowadays, operation of automated or semi-automated ranging systems is mostly executed by a computer having a radar sensing system. However, these systems cost a lot. These systems also have a problem with calculation overload which the normal systems do not. It may not be suitable for installing on every vessel.

SUMMARY

In order to solve the at least one problem, the present invention relates to automatic berthing image ranging system and operation method thereof, and more particularly to automatic berthing image ranging system for vessels oscillating freely with small amplitude and operation method thereof. In accordance with some embodiments of the disclosed subject matter, an automatic berthing image ranging system for vessels is provided, which comprising an image capturing device is configured on a vessel for capturing a reference image with a first pattern and at least two second patterns; and an electronic control unit connected with the image capturing device that is configured to: receive a reference image with a first pattern and at least two second patterns; project the reference image onto a reference plane; calculate a projection distance from the position of one second pattern in the at least two second patterns to the other second pattern, at the reference plane; divide the projection distance by a predetermined distance to yield a corresponding calibration ratio; calculate respectively a reference distance between the first pattern and each of the second pattern via the reference plane; multiply the reference distance by the corresponding calibration ratio to yield a real distance; and perform trigonometry calculations on the predetermined distance and the real distances, and accordingly estimate a value of an acute angle between the vessel and the port.

In some embodiments, the first pattern is disposed on the vessel and the at least two second patterns are disposed on a port.

In some embodiments, the value of the predetermined distance is defined as a known distance.

In some embodiments, the aforementioned known distance is defined as distance between any two of the at least two second patterns.

In accordance with some embodiments of the disclosed subject matter, an operating method of an automatic berthing image ranging system for vessels is provided, the operating method comprising: providing the aforementioned system; obtaining an to-be-recognized image, and if, the to-be-recognized image comprises the first pattern and the at least two second patterns, the electronic control unit defines the to-be-recognized image as a reference image; and, if not, re-captures the to-be-recognized image via the image capturing device; extracting a first pixel coordinate which corresponds to position of center point of the first pattern and at least two second pixel coordinates which correspond to positions of center points of each of the second pattern from the reference image; projecting the reference image onto a reference plane; converting the first pixel coordinate to a first projection coordinate and the at least two second pixel coordinates to at least two second projection coordinates; determining whether a number of the at least two second projection coordinates of the reference plane is greater than two, and if, the number of the at least two second projection coordinates of the reference plane is greater than two, the electronic control unit performs operations including: calculating a plurality of the projection distances from the position of one second projection coordinate in the at least two second projection coordinates to the other second projection coordinate; comparing values of the plurality of the projection distances; and dividing only the minimum value of the plurality of projection distances by the predetermined distance to yield a corresponding calibration ratio; and, if not, the electronic control unit divides a projection distance between the two second projection coordinates by the predetermined distance to yield the corresponding calibration ratio; calculating respectively the reference distance between the first pattern and each of the second pattern; multiplying the reference distance by the corresponding calibration ratio to yield a real distance; analyzing the reference image to define a first reference line and a second reference line that intersect to form an acute angle; performing trigonometry calculations on the predetermined distance and the real distances, and accordingly estimating a value of the acute angle; and storing the value of the acute angle.

The above summary of the present disclosure is to provide a basic description of the various aspects and features of the present disclosure. It is not a detailed description. Its purpose is not to specifically recite keys or critical elements of the present disclosure, and it is not intended to limit the scope of the present disclosure. It merely presents a few concepts of the present disclosure in a concise manner.

DETAILED DESCRIPTION OF THE INVENTION

The present invention relates to an automatic berthing image ranging system and operation method thereof. And more particularly to automatic berthing image ranging system for vessels oscillating freely with small amplitude and operation method thereof. The term "vessels" used hereinafter is to refer a smaller watercraft, such as a speed boat, a fishing boat, a recreational boat, a swift boat, a yacht etc., however not restricted to the same. In some example, the present disclosure may also be applied to an unmanned surface vessel, such as a warship, a cruise etc. Further, as used herein, the term "small amplitude" means typically that the heel angle of both roll and pitch of the aforementioned vessel are in a range from −25° to +25°, and preferably are in a range from −10° to +10°.

To clarify the purpose, technical solutions, and the advantages of the disclosure, embodiments of the present disclosure will now be described more fully hereinafter with reference to the accompanying drawings.

Figure 1:
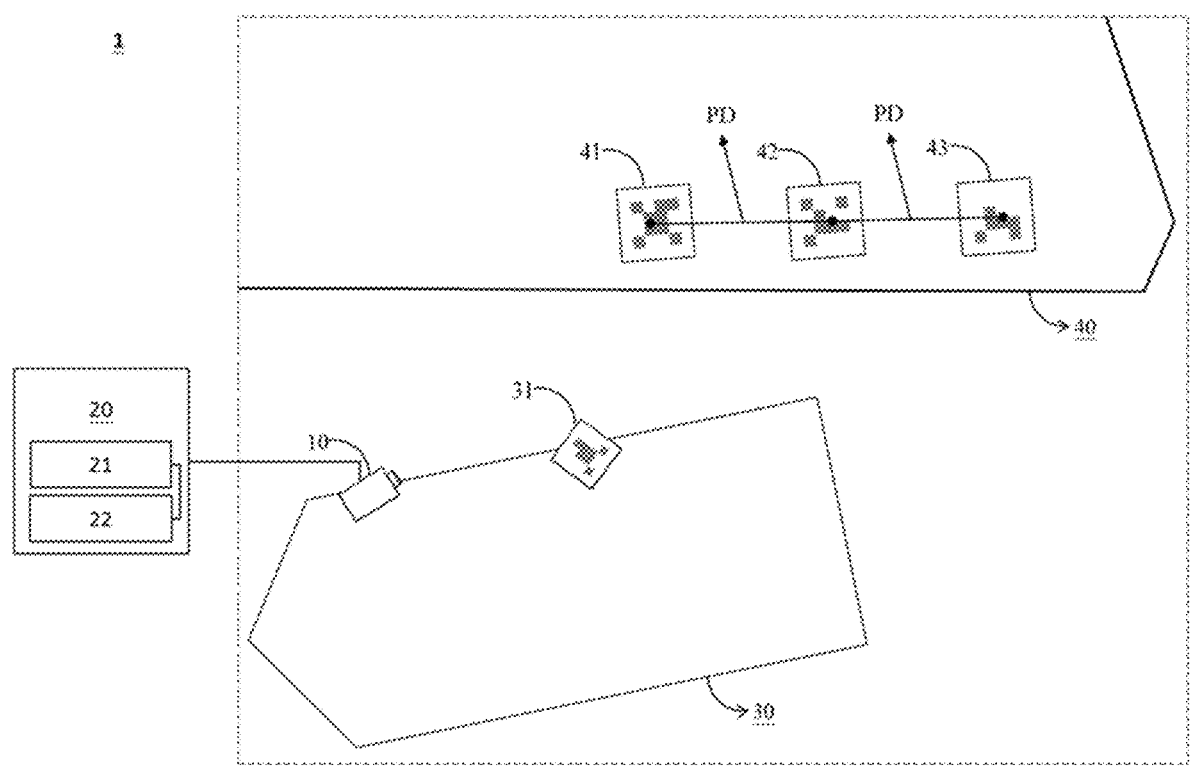
FIG. 1 is a schematic diagram depicting an automatic berthing image ranging system for vessels in accordance with an embodiment of the present disclosure.
Figure 3:
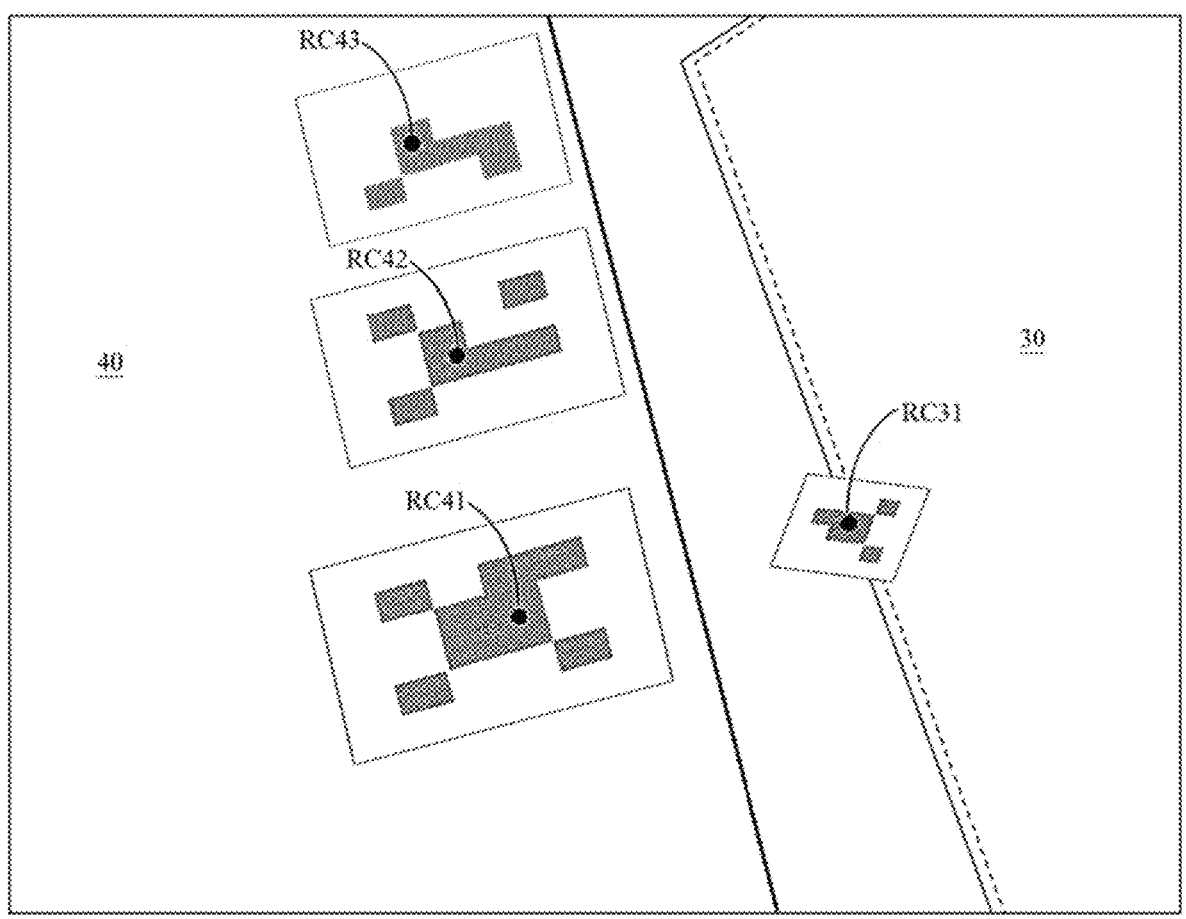
FIG. 3 is a schematic diagram depicting a reference image of the automatic berthing image ranging system for vessels in accordance with an embodiment of the present disclosure.
Figure 6:
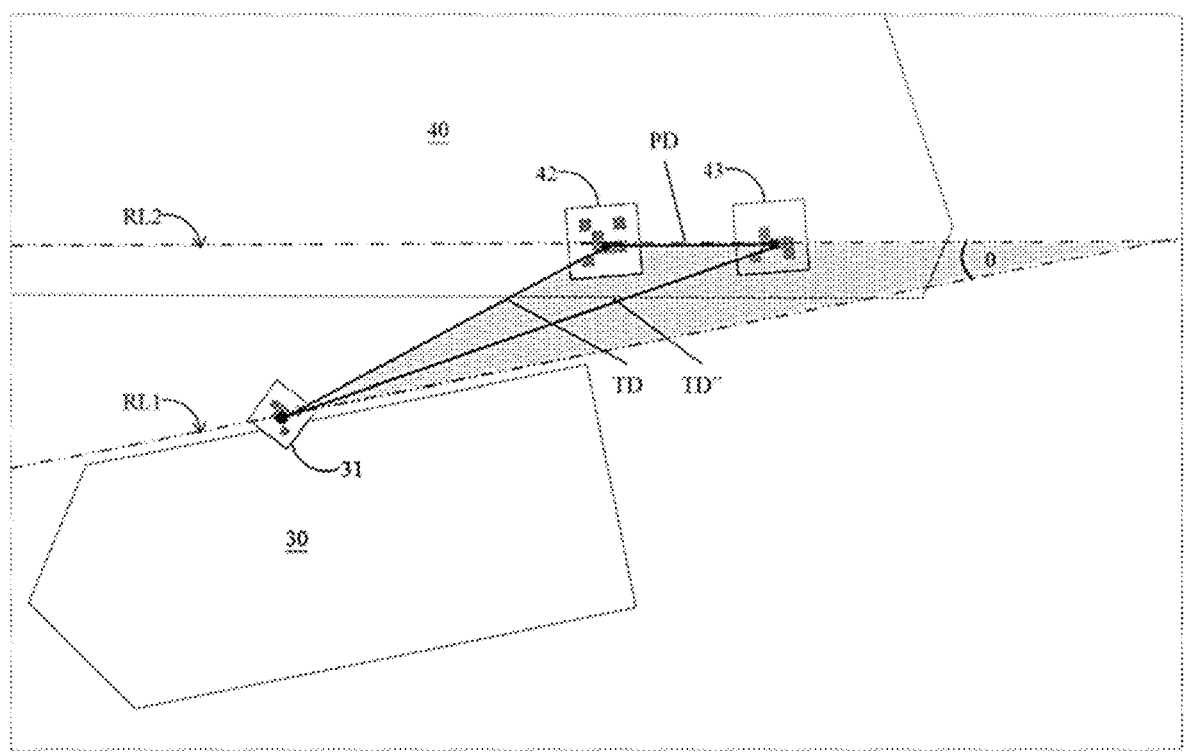
FIG. 6 is a schematic diagram depicting an acute angle of the automatic berthing image ranging system for vessels in accordance with an embodiment of the present disclosure.

Please see FIG. 1, FIG. 3 and FIG. 6. As shown in FIG. 1, the automatic berthing image ranging system 1 for vessels in accordance with an embodiment of the present disclosure. The automatic berthing image ranging system for vessels 1 may include an image capturing device 10 and an electronic control unit 20. The image capturing device 10 is configured on a vessel 30 for imaging a reference image RI from a direction including a port 40 location. The reference image RI has a first pattern 31 disposed on the vessel 30, and at least two second patterns 41, 42, 43 disposed on the port 40 where the vessel 30 may be berthed.

As described above, the image capturing device 10 can be one or more cameras. For example, the image capturing device 10 can be a high resolution camera, such as a camera having a resolution of at least 2.1-megapixels or beyond of it. The number of the image capturing device 10 in this embodiment is one.

The electronic control unit 20 is electrically connected with the image capturing device 10, and the electronic control unit 20 may include: a memory 21, and a processing unit 22 that couples to the memory 21. The memory 21 is mainly used to transmit at least one computer-readable code to the processing unit 22 for processing the reference image RI captured by the image capturing device 10. In some embodiments, memory 21 may be any available computer-readable medium such as, but not limited to, a long-term memory, a short-term memory, long short-term memory (LSTM), a volatile memory, or a no-volatile memory in order to store the aforementioned computer-readable code written or described in any appropriate computer language.

In some embodiments, the processing unit 22 may be a single processor or may include multiple microcontrollers and multiple microprocessors. For example, processing unit 22 may be implemented as a combination of a central processing unit (CPU) and a micro processing unit (MPU), a RISC, a CISC, or a GPU.

Please refer to FIG. 1 and FIG. 3. The first pattern 31 is designed as a specified mark, and the first pattern 31 is disposed on vessel 30 via a specified position relationship. The second patterns 41, 42, 43 are designed as specified marks, and the second patterns 41, 42, 43 are disposed on port 40 via a mutual positional relation between one second pattern to another second pattern. As used herein, the term "specified marks" may be any two-dimensional barcodes (Matrix codes, QR codes, Aztec codes, Maxicodes etc.) as long as them can be read and generate pixel coordinates RC31, RC41, RC42, RC43 that are used to indicate positions of the first pattern 31 and the second patterns 41, 42, 43 in reference image RI via the electronic control unit 20. Similarly, the term "pixel coordinates" may refer to two-dimensional coordinates corresponding to center points of the first pattern 31 and each second pattern 41, 42, and 43.

Furthermore, the term "specified position relationship" may typically refer to any predetermined positional information of the memory 21. For example, the first pattern 31 may be disposed anywhere on the vessel 30 as long as the first pattern 31 and the at least two second patterns 41, 42, 43 can be simultaneously captured via the image capturing device 10 according to a set predetermining positional information of FIG. 1. Similarly, those second patterns 41, 42, 43 may be disposed anywhere on the port 40 as long as their center points are aligned with each other and arranged equidistantly to each other (e.g., the second pattern 41, 42, 43 may be disposed in the same linear direction of the port 40 at 1-meter intervals).

As the former description, when a distance measuring event happens during the vessel 30 is berthing in FIG. 6, only the real distance TD and real distance TD" which are between first pattern 31 and each second patterns 42, 43 need to be estimated. The electronic control unit 20 performs the trigonometry calculations (Pythagorean Theorem etc.) according to the real distance TD and real distance TD". Therefore electronic control unit 20 can estimate a value of an acute angle θ between the vessel 30 and the port 40, the estimated value will be saved into the memory 21. After the value has been saved, it can be utilized for path planning in future.

In practical applications, a photography angle of the image capturing device 10 can be selectively fixed. In current case, the heading of vessel 30 and the location of port 40 are fixed and known, therefore the electronic control unit 20 can confirm relative position between vessel 30 and port 40. On the other hand, the confirmed relative position between vessel 30 and port 40 make the image capturing device 10 can be set to further check the first pattern 31 and at least two second patterns 41, 42, 43 are both existing in a photography range of the image capturing device 10 or not. If the first pattern 31 and at least two second patterns 41, 42, 43 are both existed, generating a to-be-recognized image. Thus, the recognizability of the imaging of the first pattern 31 and the at least two second patterns 41, 42, 43 obtained by electronic control unit 20 can be improved, thereby effectively reducing calculation load of the electronic control unit 20.

The operating method of the automatic berthing image ranging system for vessels 1 will be further explained in the following description.

Referring to FIG. 2 to FIG. 6, FIG. 2 is a flowchart illustrating an operating method of an automatic berthing image ranging system for vessels 1 in accordance with an embodiment of the present disclosure. The operating method includes the following steps.

Step S1: a to-be-recognized image with a first pattern 31 and at least two second patterns 41, 42, 43 are received and defined as a reference image RI via an electronic control unit 20. An image capturing device 10 re-captures to-be-recognized image when the electronic control unit 20 cannot define the to-be-recognized image as reference image RI. In practical applications, when a vessel 30 approaches port 40, the image capturing device 10 captures the to-be-recognized image of the port 40 and its surroundings.

Step S2: as shown in FIG. 3, the electronic control unit 20 extracts a first pixel coordinate RC31 corresponding to position of center point of first pattern 31 and at least two second pixel coordinates RC41, RC42, RC43 corresponding to positions of center points of each of the second patterns 41, 42, 43 from the reference image RI respectively.

Figure 4:
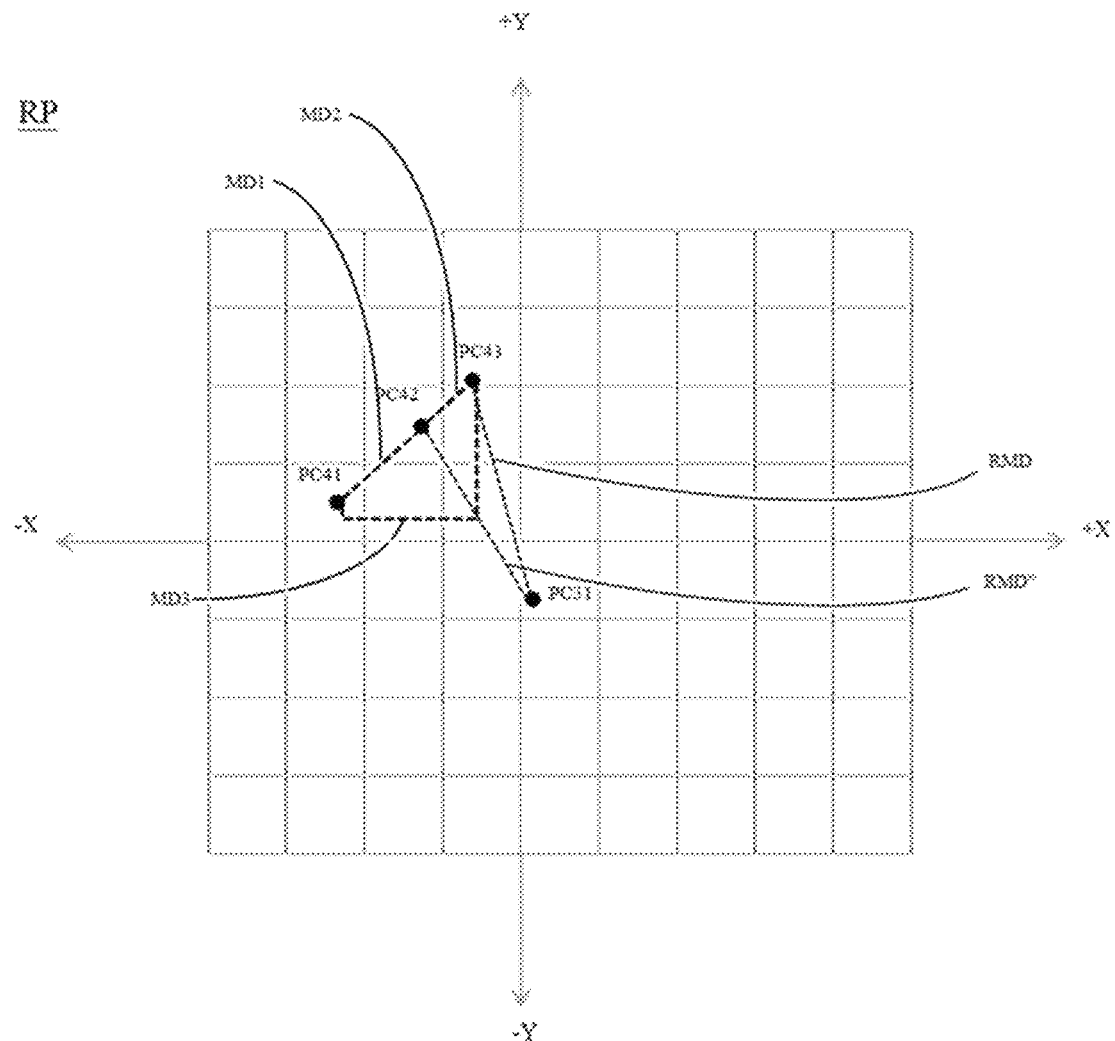
FIG. 4 is a schematic diagram depicting a reference plane of the automatic berthing image ranging system for vessels in accordance with an embodiment of the present disclosure.
Figure 5:
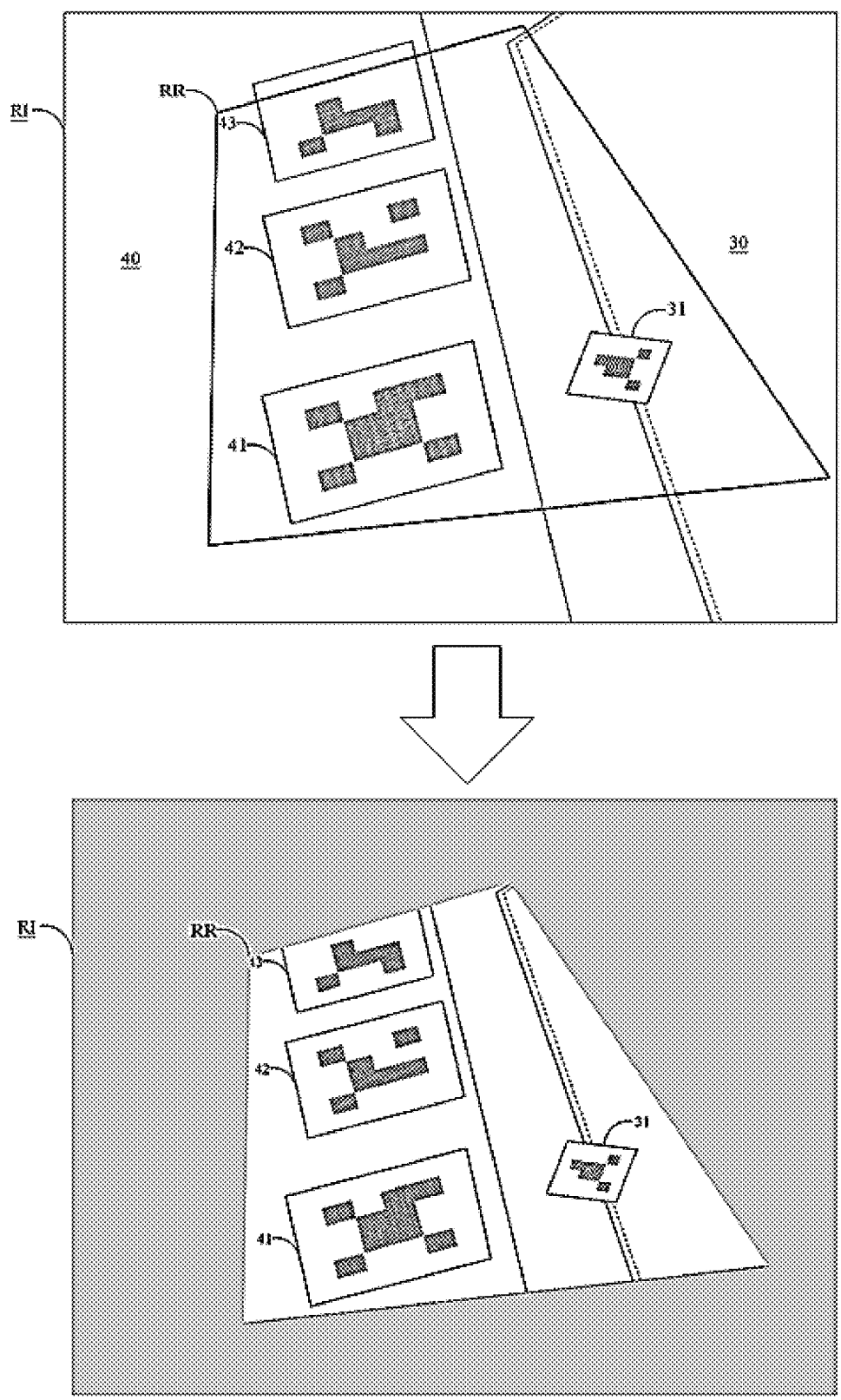
FIG. 5 is a schematic diagram depicting an effective range of the automatic berthing image ranging system for vessels in accordance with an embodiment of the present disclosure.

Step S3: as shown in FIG. 4, the electronic control unit 20 projects the reference image RI onto an reference plane RP, then converts the first pixel coordinate RC31 to a first projection coordinate PC31 and the at least two second pixel coordinates RC41, RC42, RC43 to at least two second projection coordinates PC41, PC42, PC43 respectively.

Figure 2:
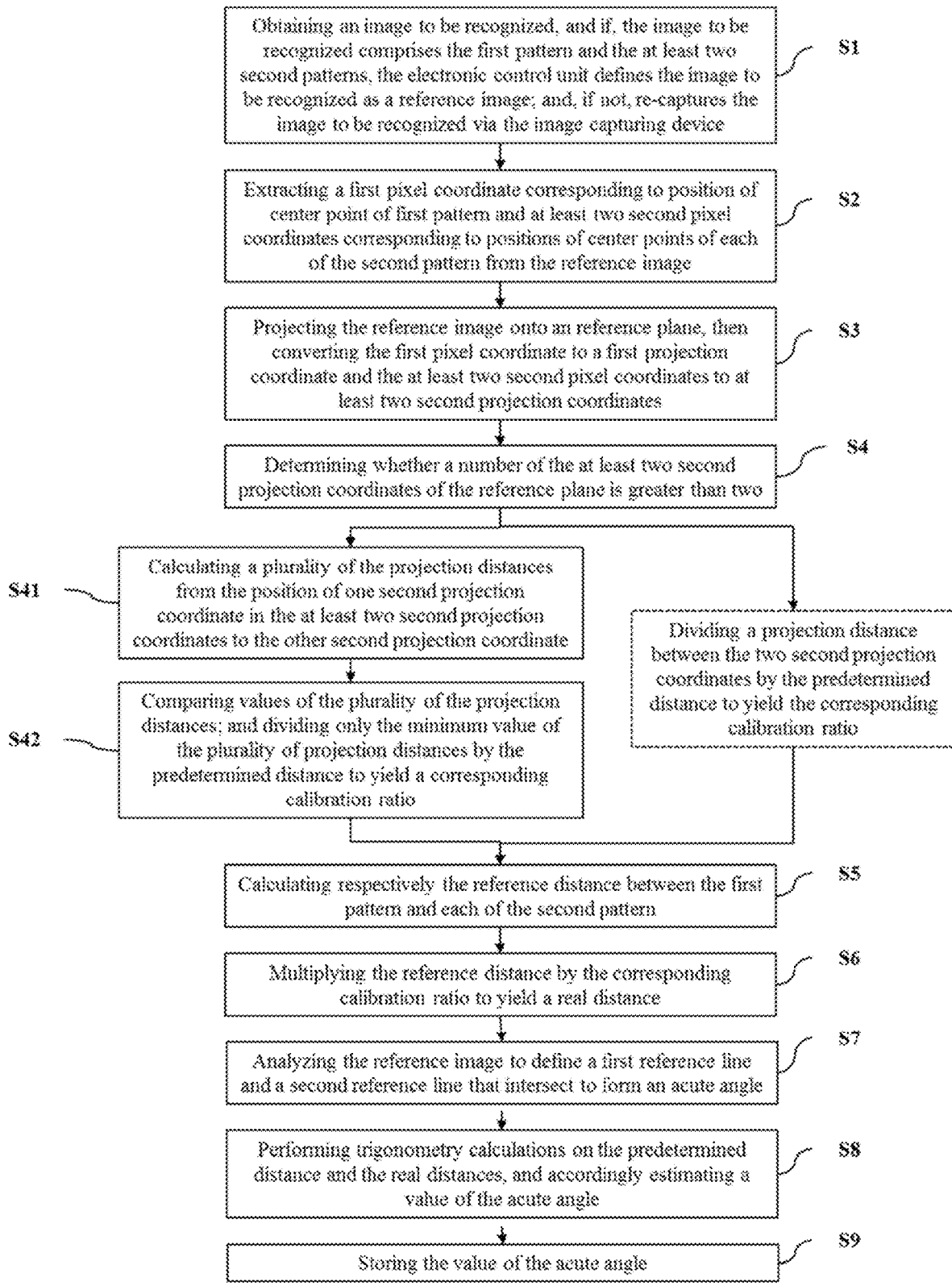
FIG. 2 is a flowchart illustrating an operating method of an automatic berthing image ranging system for vessels in accordance with an embodiment of the present disclosure.

Step S4: the electronic control unit 20 determines whether a number of the at least two second projection coordinates PC41, PC42, PC43 of the reference plane RP is greater than two. If the number of the at least two second projection coordinates PC41, PC42, PC43 of the reference plane RP is greater than two, please refer to FIG. 2. As shown in FIG. 2, the step S4 further comprises steps S41 to S42, and the following steps S41 to S42 will be executed. However, if the number of the at least two second projection coordinates PC41, PC42, PC43 of the reference plane RP is not greater than two, the electronic control unit 20 divides a projection distance MD2 between the two second projection coordinates PC42, PC43 by a predetermined distance PD to yield a corresponding calibration ratio.

As the abovementioned step 4, the Step S41 is that the electronic control unit 20 calculates a plurality of the projection distances MD1, MD2, MD 3 from the position of one second projection coordinate in the at least two second projection coordinates PC41, PC42, PC43 to the other second projection coordinate, then comparing values of the plurality of the projection distances MD1, MD2, MD 3. Furthermore, the Step S42 is that the electronic control unit 20 only divides the minimum value of the plurality of projection distances MD2 by the predetermined distance PD to yield a corresponding calibration ratio.

Step S5: the electronic control unit 20 calculates reference distances RMD and RMD" between the first projection coordinate PC31 and each of the second projection coordinates PC42, PC43 respectively.

Step S6: the electronic control unit 20 multiplies each one of a plurality of reference distances RMD, RMD" by the corresponding calibration ratio to yield a plurality of real distances TD, TD" respectively.

Step S7: the electronic control unit 20 analyzes the reference image RI to define a first reference line RL1 and a second reference line RL2 that intersect to form the acute angle θ.

Herein, as shown in FIG. 6, the first reference line RL1 defined as virtual line passes through center point of the first pattern 31 and extends in heading of the vessel 30. Simultaneously, the second reference line RL2 defined as virtual line passes through center points of the at least two second patterns 41, 42, 43 and extends forward-reward along the port 40.

Step S8: the electronic control unit 20 performs trigonometry calculations on the predetermined distance PD and the plurality of real distances TD, TD", then accordingly estimating the value of the acute angle θ.

Step S9: the electronic control unit 20 stores the value of the acute angle θ to the memory 21.

Figure 7:
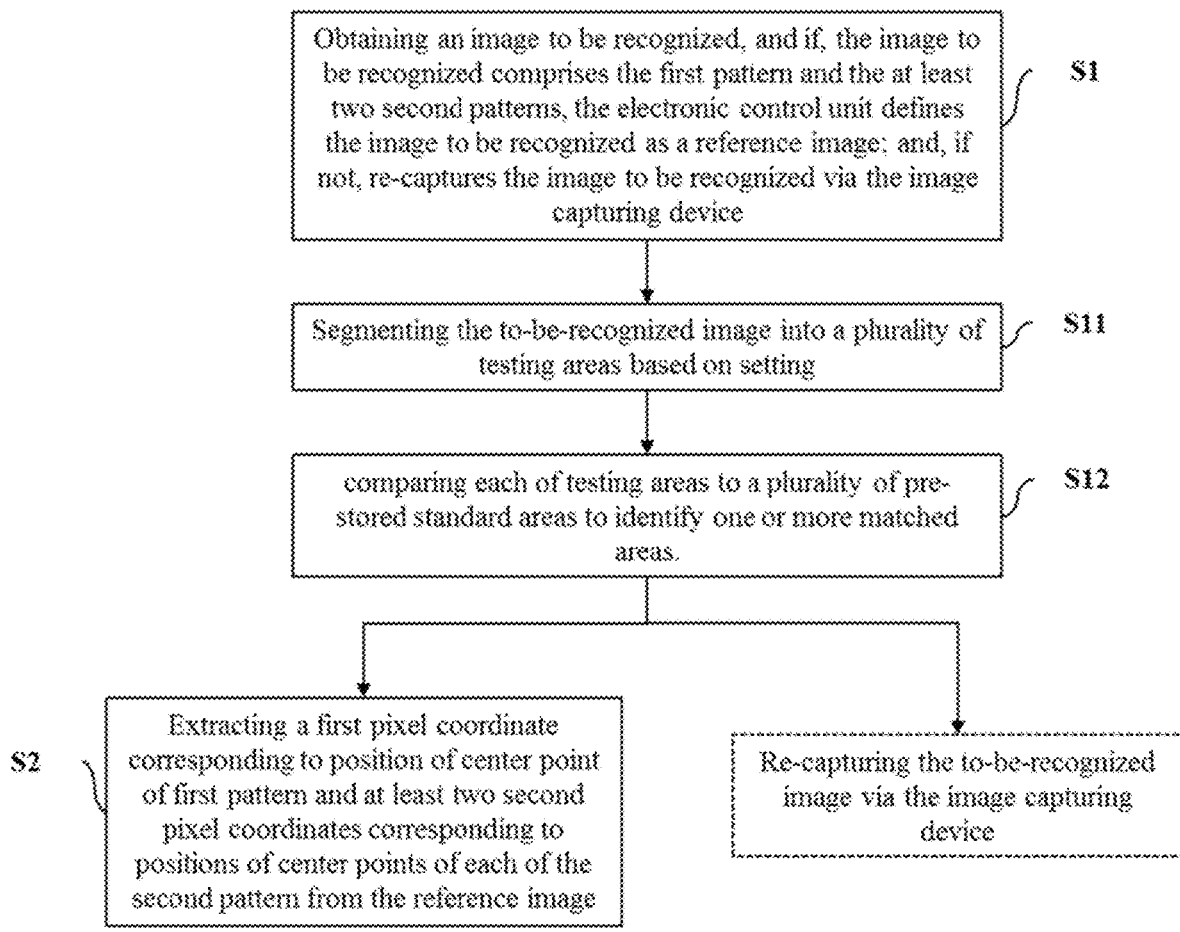
FIG. 7 is another flowchart illustrating an operating method of an automatic berthing image ranging system for vessels in accordance with an embodiment of the present disclosure.

As shown in FIG. 7, after the end of the receiving action in step S1 in present embodiment, the operating method further comprises steps S11 to S13.

Step S11: the electronic control unit 20 segments the to-be-recognized image into a plurality of testing areas based on setting. Step S12: the electronic control unit 20 compares each of testing areas to a plurality of pre-stored standard areas to identify one or more matched areas. If one or more match areas comprise the first pattern 31 and the at least two second patterns 41, 42, 43, the electronic control unit 20 defines the to-be-recognized image as the reference image RI and performs the step S2, and if not, re-captures the to-be-recognized image via the image capturing device 10.

In practical applications of the step S12, the electronic control unit 20 may compare the associated features (area sizes, position relationships between areas, distances between areas etc., or pixel sequences, pixel gray values etc.) extracting from each of testing areas to a trained database having the plurality of pre-stored standard areas to identify one or more matched areas via a trained neural network model (CNN etc.), then determining whether to identify the to-be-recognized image as the reference image RI on the basis of a comparison result obtained from the previous step, in the step S13. In this case, the term "compare" may refer to describe the calculation process based on Intersection over Union (IoU) (e.g., by capturing and processing the associated features between the testing areas and the pre-stored standard areas).

Figure 8:
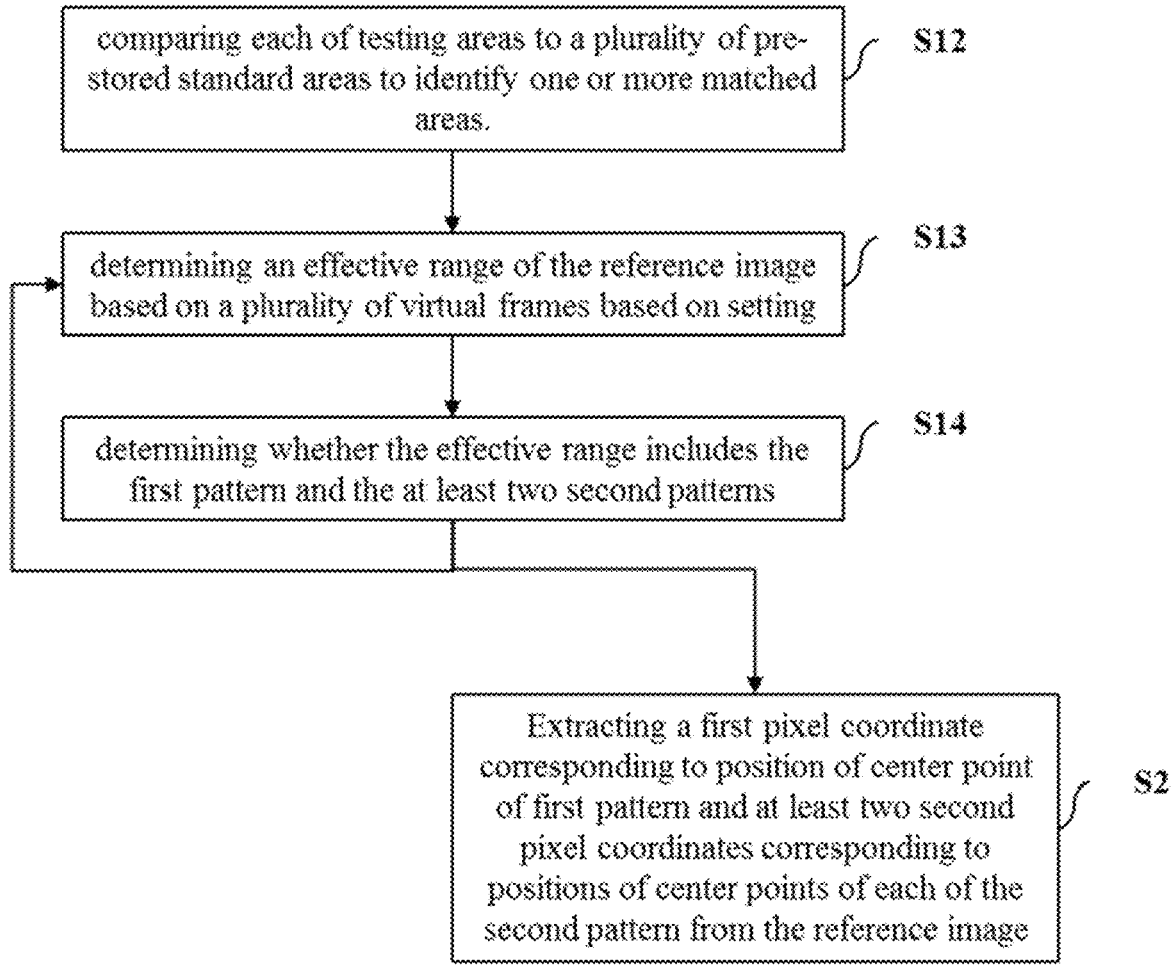
FIG. 8 is the other flowchart illustrating an operating method of an automatic berthing image ranging system for vessels in accordance with an embodiment of the present disclosure.

In addition, as shown in FIG. 8, after the end of the comparing action in step S12, the operating method further comprises steps S13 to S14.

Step S13: the electronic control unit 20 determines an effective range RR of the reference image RI based on a plurality of virtual frames based on setting. Step S14: the electronic control unit 20 determines whether the effective range RR includes the first pattern 31 and the at least two second patterns 41, 42, 43. If the effective range RR includes the first pattern 31 and the at least two second patterns 41, 42, 43, the electronic control unit 20 only extracts the first pixel coordinate RC31 and the at least two second pixel coordinates RC41, RC42, RC43 from the effective range RR of the reference image RI and performs the step S2, and if not, re-performs the step S13 to re-determine the effective range RR of the reference image RI based on the plurality of virtual frames.

Herein, the aforementioned virtual frames may be any appropriate shape of frame such as, but not limited to rectangular frames shown in FIG. 4.

Please notice that the determining action in step S14 can be realized by a method which is similar to the comparing action in step S12. Preferably, before the electronic control unit 20 determines whether the effective range RR includes the first pattern 31 and the at least two second patterns 41, 42, 43 via a trained neural network model, each of the effective range RR is segmented into a plurality of areas in accordance with a fixed divided basic (e.g., according to a specified threshold).

The above description is merely the embodiments in the present disclosure; the claim is not limited to the description thereby. The equivalent structure or changing of the process of the content of the description and the figures, or to implement to other technical field directly or indirectly should be included in the claim. All other embodiments obtained by a person of ordinary skill in the art based on the embodiments of the present disclosure without creative efforts shall fall within the protection scope of the present disclosure.

What is claimed is:

1. An automatic berthing image ranging system for vessels, comprising:
    an image capturing device, configured on a vessel; wherein the image capturing device captures a reference image which comprises a first pattern and at least two second patterns; wherein the first pattern is disposed on the vessel and the at least two second patterns are disposed on a port; and
    an electronic control unit, connected with the image capturing device; wherein the electronic control unit is configured for implementing an operating method of an automatic berthing image ranging system for vessels; wherein the operating method of the automatic berthing image ranging system for vessels comprises:
        receiving the reference image form the image capturing device;
        projecting the reference image onto a reference plane;
        calculating a projection distance from the position of one second pattern in the at least two second patterns to another second pattern, at the reference plane;
        dividing the projection distance by a predetermined distance to yield a corresponding calibration ratio;
        calculating a reference distance between the first pattern and each of the second patterns respectively via the reference plane;
        multiplying each of reference distances by the corresponding calibration ratio individually to yield a plurality of real distances; and
        performing trigonometry calculations on the predetermined distance and the real distances, accordingly estimating a value of an acute angle between the vessel and the port;
        wherein value of the predetermined distance is defined as a known distance;
        wherein the known distance is defined as distance between any two of the at least two second patterns.

2. The automatic berthing image ranging system for vessels of claim 1, wherein the first pattern is Matrix code, QR code, Aztec code, or Maxicode.

3. The automatic berthing image ranging system for vessels of claim 1, wherein the at least two second patterns are Matrix codes, QR codes, Aztec codes, or Maxicodes.

4. The automatic berthing image ranging system for vessels of claim 1, wherein the at least two second patterns are disposed equidistantly along the port.

5. An operating method of an automatic berthing image ranging system for vessels, comprising:
    providing the automatic berthing image ranging system for vessels of claim 1;
    obtaining an to-be-recognized image, wherein if the to-be-recognized image comprises the first pattern and the at least two second patterns, the electronic control unit defines the to-be-recognized image as the reference image, and if not, re-captures the to-be-recognized image via the image capturing device;
    extracting a first pixel coordinate and at least two second pixel coordinates from the reference image; wherein the first pixel coordinate corresponds to position of center point of the first pattern and the at least two pixel coordinates correspond to positions of center points of each of the second pattern;
    projecting the reference image onto the reference plane;
    converting the first pixel coordinate to a first projection coordinate and the at least two second pixel coordinates to at least two second projection coordinates;
    determining whether a number of the at least two second projection coordinates of the reference plane is greater than two;
    wherein if the number of the at least two second projection coordinates of the reference plane is greater than two, the electronic control unit performs operations including:
        calculating a plurality of the projection distances from one second projection coordinate in the at least two second projection coordinates to another second projection coordinate;
        comparing values of the plurality of the projection distances; and dividing a minimum value of the plurality of projection distances by the predetermined distance to yield the corresponding calibration ratio;
    wherein if the number of the at least two second projection coordinates of the reference plane is equal to two, the electronic control unit divides a projection distance between the two second projection coordinates by the predetermined distance to yield the corresponding calibration ratio;
    calculating the reference distance between the first projection coordinate and each of the second projection coordinates respectively;
    multiplying each one of the plurality of reference distances by the corresponding calibration ratio individually to yield the plurality of real distances;
    analyzing the reference image to define a first reference line and a second reference line that intersect to form the acute angle;
    performing trigonometry calculations on the predetermined distance and the plurality of real distances, and accordingly estimating the value of the acute angle; and
    storing the value of the acute angle.

6. The operating method of an automatic berthing image ranging system for vessels as claimed in claim 5, wherein the first reference line defined as virtual line passing through center point of the first pattern and extending in heading of the vessel; and the second reference line defined as virtual line passing through center points of the at least two second patterns and extending forward-reward along the port.

7. The operating method of an automatic berthing image ranging system for vessels as claimed in claim 5, further comprising:
    segmenting the to-be-recognized image into a plurality of testing areas based on setting; and
    comparing each of testing areas to a plurality of pre-stored standard areas to identify at least one matched area; wherein if the at least one match area comprises the first pattern and the at least two second patterns, the electronic control unit defines the to-be-recognized image as the reference image, and if not, re-captures the to-be-recognized image via the image capturing device.

8. The operating method of an automatic berthing image ranging system for vessels as claimed in claim 7, further comprising:
   determining an effective range of the reference image based on a plurality of virtual frames based on setting; and
   determining whether the effective range includes the first pattern and the at least two second patterns; wherein if the effective range includes the first pattern and the at least two second patterns, the electronic control unit only extracts the first pixel coordinate and the at least two second pixel coordinates from the effective range of the reference image, and if not, re-determines the effective range of the reference image based on the plurality of virtual frames.

9. The operating method of an automatic berthing image ranging system for vessels as claimed in claim 8, wherein the plurality of virtual frames are rectangular frames.

\* \* \* \* \*